(12) United States Patent
Fukuhara et al.

(10) Patent No.: US 7,789,196 B2
(45) Date of Patent: Sep. 7, 2010

(54) SOUND-ABSORBING MATERIAL, PRODUCTION METHOD FOR SOUND-ABSORBING MATERIAL, AND SOUND-ABSORBING STRUCTURE

(75) Inventors: Chie Fukuhara, Hiroshima (JP); Naoko Yorozu, Hiroshima (JP); Eiji Murasawa, Hiroshima (JP); Tsuyoshi Sugihara, Hiroshima (JP)

(73) Assignee: Mazda Motor Corporation (JP)

( * ) Notice: Subject to any disclaimer, the term of this patent is extended or adjusted under 35 U.S.C. 154(b) by 117 days.

(21) Appl. No.: 12/182,515

(22) Filed: Jul. 30, 2008

(65) Prior Publication Data

US 2009/0038881 A1 Feb. 12, 2009

(30) Foreign Application Priority Data

Aug. 6, 2007 (JP) ............... 2007-203931

(51) Int. Cl.
E04B 1/82 (2006.01)
E04B 1/84 (2006.01)

(52) U.S. Cl. .................. 181/286; 181/290; 181/294

(58) Field of Classification Search ............. 186/286, 186/290, 204, 294
See application file for complete search history.

(56) References Cited

U.S. PATENT DOCUMENTS

| 5,504,281 | A | * | 4/1996 | Whitney et al. | ............ 181/286 |
| 5,858,530 | A | * | 1/1999 | McCullough, Jr. | .......... 428/367 |
| 6,256,600 | B1 | * | 7/2001 | Bolton et al. | ................. 703/6 |
| 6,789,645 | B1 | * | 9/2004 | Deblander | ................. 181/290 |
| 7,201,253 | B2 | * | 4/2007 | Duval et al. | ................. 181/204 |
| 2004/0099476 | A1 | * | 5/2004 | Swift et al. | ................. 181/286 |
| 2008/0196971 | A1 | * | 8/2008 | Charbonnier et al. | ....... 181/290 |

FOREIGN PATENT DOCUMENTS

| JP | 08-039596 | 2/1996 |
| JP | 11-006201 | 1/1999 |
| JP | 2004-191445 | 7/2004 |

* cited by examiner

Primary Examiner—Jeffrey Donels
Assistant Examiner—Christina Russell
(74) Attorney, Agent, or Firm—Studebaker & Brackett PC; Donald R. Studebaker

(57) ABSTRACT

Disclosed is a sound-absorbing material, which has a flow resistivity R of $3.3 \times 10^4$ N·s/m$^4$ or more, a Young's modulus E of $1.2 \times 10^3$ to $2.0 \times 10^4$ N/m$^2$, and a loss factor $\delta$ of 0.12 or less. The sound-absorbing material of the present invention can enhance a sound absorption capability in a wide range of a low/intermediate-frequency region to a high-frequency region at a higher level as compared with conventional sound-absorbing materials.

6 Claims, 16 Drawing Sheets

LOW/INTERMEDIATE-FREQUENCY
REGION (100 TO 800Hz)

HIGH-FREQUENCY REGION
(GREATER THAN 800Hz)

FIG. 5

| | NUMERICAL RANGE OF SOUND-ABSORBING MATERIAL OF PRESENT INVENTION | SOUND-ABSORBING MATERIAL A | SOUND-ABSORBING MATERIAL B | SOUND-ABSORBING MATERIAL C |
|---|---|---|---|---|
| TARGET SOUND | | HIGH-FREQUENCY SOUND | LOW/INTERMEDIATE-FREQUENCY SOUND | LOW/INTERMEDIATE-FREQUENCY & HIGH-FREQUENCY SOUNDS |
| YOUNG'S MODULUS E | $1.2 \times 10^3$ TO $2 \times 10^4$ | $2.8 \times 10^4$ | $1.30 \times 10^4$ | $1.9 \times 10^4$ |
| LOSS FACTOR $\delta$ | 0.12 OR LESS | 0.27 | 0.08 | 0.108 |
| FLOW RESISTANCE R | $3.3 \times 10^4$ OR MORE | $7.2 \times 10^4$ | $6.1 \times 10^3$ | $6.1 \times 10^4$ |

| PHYSICAL PROPERTIES / PARAMETER | | RAW MATERIAL | PORES | CRIMP |
|---|---|---|---|---|
| LOSS FACTOR δ | SMALL | PET | SOLID | ... |
| YOUNG'S MODULUS E | LARGE | PET | SOLID | ... |
| | SMALL | ACRYLIC | HOLLOW | ... |
| FLOW RESISTANCE R | LARGE | ... | ... | YES |

FIG. 12

|  | LEVEL 1 | LEVEL 2 | LEVEL 3 |
|---|---|---|---|
| FORMING TEMPERATURE | 130°C | 160°C | 180°C |
| FORMING CYCLE TIME | 4.5 min | 6 min | 9 min |
| BINDER-FIBER RATIO | 15% | 20% | 25% |

SOUND-ABSORBING MATERIAL, PRODUCTION METHOD FOR SOUND-ABSORBING MATERIAL, AND SOUND-ABSORBING STRUCTURE

BACKGROUND OF THE INVENTION

1. Field of the Invention

The present invention relates to a sound-absorbing material, a production method for a sound-absorbing material, and a sound-absorbing structure.

2. Background Art

As a conventional technique relating to a sound-absorbing material, it has been proposed to form a foamable resin binder interposed in a space between fibers to allow fine particles to be held by the fibers, so as to obtain a sound-absorbing material having a Young's modulus of $10^5$ N/m$^2$ or less, as disclosed in JP 08-039596A. Allegedly, the disclosed technique can provide a sound-absorbing material which exhibits excellent sound absorption characteristics in a low-frequency region, and has less performance degradation due to drop-off of the fine particles.

There has also been proposed another sound-absorbing material comprising a porous body having a loss factor of 0.05 or more, an air-permeability value of 0.1 dm$^3$/S or more, and a thickness of 1 to 50 mm, as disclosed in JP 2004-191445A. Allegedly, the disclosed sound-absorbing material can enhance a sound absorption effect in the range of a low-frequency region around 100 Hz to a high-frequency region around 2000 Hz.

As a sound-absorbing structure using a sound-absorbing material, there has been proposed a dome-shaped structure comprising a peripheral sub-structure, and a roof sub-structure, wherein the roof sub-structure includes a first layer formed of a film member, a second layer formed of a sound-absorbing member and located on an outward side of the first layer, a third layer formed of a plate member and located on an outward side of the second layer, a first airspace defined between the first and second layers, and a second airspace defined between the second and third layer, and wherein the film member forming the first layer is made of an air-permeable material to have a flow resistivity of $1\times10^5$ to $2\times10^6$ N·s/m$^4$, as measured at 20° C. and 1 atm, as disclosed in JP 11-006201A. Allegedly, the disclosed dome-shaped structure exhibits excellent acoustic characteristics, such as sound-absorbing capability, and has an internal space causing less echo generation.

Although each of the JP 08-039596A, JP 2004-191445A and JP 11-006201A discloses a technique of enhancing sound-absorbing capability, the disclosed technique is made with a focus on only a part of physical properties of a sound-absorbing material, such as a flow resistivity, a Young's modulus and a loss factor. That is, these conventional techniques have not been based on thorough consideration on to which of all physical properties of a sound-absorbing material a sound-absorbing capability of the sound-absorbing material is related, and how deeply each of the related physical properties is involved in the sound-absorbing capability. Consequently, their sound-absorbing capabilities over the range of a low/intermediate-frequency region to a high-frequency region are not exactly high.

SUMMARY OF THE INVENTION

Under the above circumstances, through various researches, the inventers have found that a flow resistivity R, a Young's modulus E and a loss factor δ are deeply involved in a sound-absorbing capability for a low/intermediate-frequency sound and a high-frequency sound, and most of the sound-absorbing capability is determined by the three physical properties.

The present invention has been made based on the above knowledge, and it is an object of the present invention to provide a sound-absorbing material capable of exhibiting a sound-absorbing capability over a wide range of a low/intermediate-frequency region to a high-frequency region at a higher level than ever before. It is another object of the present invention to provide a production method for the sound-absorbing material, and a sound-absorbing structure using the sound-absorbing material.

According to a one aspect of the present invention, there is provided a sound-absorbing material which has a flow resistivity R of $3.3\times10^4$ N·s/m$^4$ or more, a Young's modulus E of $1.2\times10^3$ to $2.0\times10^4$ N/m$^2$, and a loss factor δ of 0.12 or less.

According to another aspect of the present invention, there is provided a method of producing a sound-absorbing material, which comprises the step of pressing a fiber mixture including matrix fibers and binder fibers, under heating, to form the fiber mixture into a given shape, wherein a type of the matrix fibers, a percentage of hollowness of the matrix fibers, a crimping rate of the matrix fibers, a forming temperature, a forming cycle time, and a ratio of the binder fibers to the entire fiber mixture, are adjusted to allow the sound-absorbing material to have a flow resistivity R of $3.3\times10^4$ N·s/m$^4$ or more, a Young's modulus E of $1.2\times10^3$ to $2.0\times10^4$ N/m$^2$, and a loss factor δ of 0.12 or less.

According to yet another aspect of the present invention, there is provided a sound-absorbing structure which comprises a pair of plate members disposed in opposed relation to each other to define a sound-absorbing space therebetween, and a sound-absorbing material disposed within the sound-absorbing space, wherein one of the pair of plate members is a vibrating plate member having a vibratable portion adapted to be brought into micro-vibration by a wave motion in a low/intermediate-frequency region, and the sound-absorbing material is disposed at a position facing the vibratable portion, wherein the sound-absorbing material has a flow resistivity R of $3.3\times10^4$ N·s/m$^4$ or more, a Young's modulus E of $1.2\times10^3$ to $2.0\times10^4$ N/m$^2$, and a loss factor δ of 0.12 or less.

BRIEF DESCRIPTION OF THE DRAWINGS

FIG. 5 is a table showing physical property values of a sound-absorbing material according to a first embodiment of the present invention, together with physical property values of comparative examples.

FIG. 12 is a table for explaining the forming cycle time, the forming temperature and the binder-fiber ratio for use in each of three levels in FIGS. 9 to 11.

DESCRIPTION OF THE PREFERRED EMBODIMENTS

With reference to the drawings, the present invention will now be described based on an embodiment thereof.

[A] Sound-Absorbing Material

Firstly, a sound-absorbing material according to a first embodiment of the present invention will be described below.

(A-1-i) A sound-absorbing material according to the first embodiment is produced by forming fibers, such as natural fibers or synthetic fibers, into a plate shape. Sound absorption characteristics of the sound-absorbing material are specified using a flow resistivity R, a Young's modulus E and a loss factor δ. The reason is that, in both a low/intermediate-frequency region (i.e., a frequency region of 100 to 800 Hz) and a high-frequency region (i.e., a frequency region of greater than 800 Hz), most of a total contribution rate of all influence factors [i.e., factors influencing the sound absorption characteristics (sound-absorbing capability) of the sound-absorbing material] to the sound absorption characteristics is occupied by a sum of respective contribution rates of the above three physical properties, i.e., the flow resistivity R, the Young's modulus E and the loss factor δ.

Figure 1:
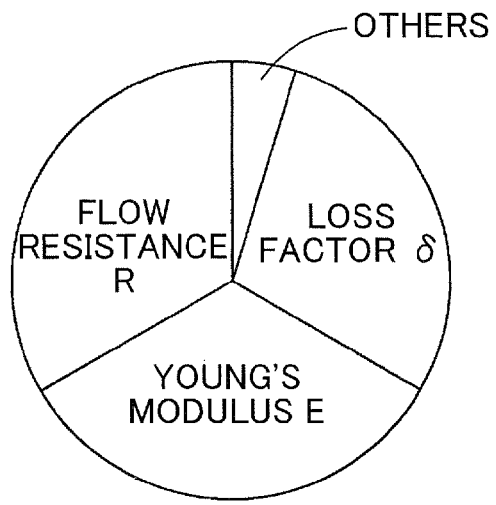
FIG. 1 is a graph showing respective contribution rates of influence factors to absorption of a low/intermediate-frequency sound.
Figure 2:
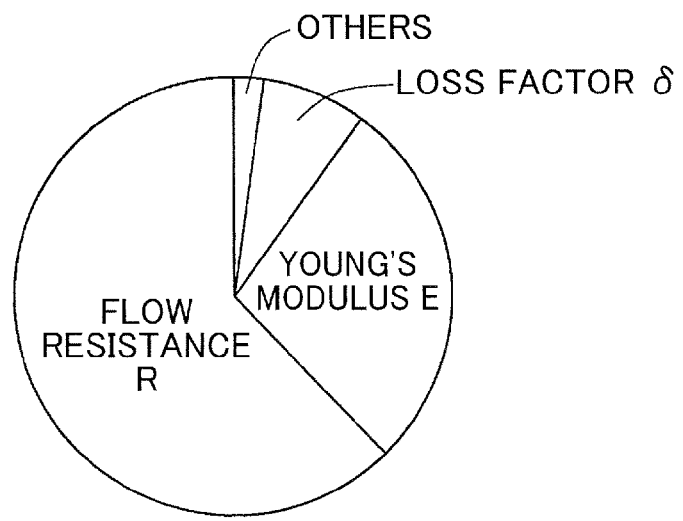
FIG. 2 is a graph showing respective contribution rates of influence factors to absorption of a high-frequency sound.

(A-1-ii) Through inventors' researches on respective contribution rates of influence factors (acoustic parameters based on the Biot's theory) to sound absorption characteristics in each of a low/intermediate-frequency region and a high-frequency region, the results illustrated in FIGS. 1 and 2 have been obtained. FIG. 1 shows respective contribution rates of the influence factors (Biot's parameters) to the sound absorption characteristics in the low/intermediate-frequency region, and FIG. 2 shows respective contribution rates of the influence factors (Biot's parameters) to the sound absorption characteristics in the high-frequency region. The results were obtained by preparing a plurality of samples while allowing each of the Biot's parameters thereof to be changed to a plurality of levels, and deriving a relationship between each of the Biot's parameters and a measured sound absorption characteristic value, as a contribution rate, using a multivariate analysis technique. Generally, factors influencing sound absorption characteristics of a sound-absorbing material (i.e., influence factors) are regarded as including a thermal characteristic length, a viscous characteristic length, a tortuosity, a loss factor, a Young's modulus, and a flow resistivity. The results illustrated in FIGS. 1 and 2 show that a sum of respective contribution rates of the flow resistivity R, the Young's modulus E and the loss factor δ accounts for about 90% of a total contribution rate of all the influence factors. In other words, the results show that the contribution rates of the above three influence factors (i.e., the flow resistivity R, the Young's modulus E and the loss factor δ) dominate the sound absorption characteristics in each of the low/intermediate-frequency region and the high-frequency region, or predominantly contribute to absorption of a low/intermediate-frequency sound (i.e., sound in the low/intermediate-frequency region) and a high-frequency sound (i.e., sound in the high-frequency region). In view of the above results, the sound absorption characteristics of the sound-absorbing material according to the first embodiment are defined using the flow resistivity R, the Young's modulus E and the loss factor δ, as mentioned above.

(A-1-iii) Each of the flow resistivity R, the Young's modulus E and the loss factor δ defining the sound absorption characteristics of the sound-absorbing material according to the first embodiment is a physical property as described below.

(A-1-iii-a) The flow resistivity R is one of the measures indicative of intrinsic characteristics of a material. Specifically, the flow resistivity R is a measure indicative of a level of air-impermeability of a material (sound-absorbing material) when air is supplied to pass through the material. More specifically, the flow resistivity R can be expressed by the following formula: $R=\Delta P/(v \cdot d)$, wherein: $\Delta P$ is a pressure difference ($N/m^2$) across the material occurring during passing of air therethrough; v is a flow velocity (m/s) of air passing through the material; and d is a thickness (m) of the material in an airflow direction. A unit of the flow resistivity R is $N \cdot s/m^4$.

For example, a specific method of measuring the flow resistivity R may comprise: setting a material in a measurement tube; supplying compressed air from one end of the measurement tube using a compressor while evacuating air from the other end of the measurement tube using a decompressor, in such a manner that the flow velocity v of the air passing through the material is adjusted to be a constant value; then measuring the pressure difference $\Delta P$ across the material under the above condition using an accurate differential-pressure meter; and calculating the flow resistivity R based on the measured pressure difference ΔP and flow velocity v.

(A-1-iii-b) The Young's modulus E is a measure indicative of hardness (elastic modulus) of a material. Specifically, the Young's modulus E is a measure indicative of a level of vibration capability of the material itself. More specifically, the Young's modulus E can be expressed by the following formula: E=σ/ε, wherein σ is a perpendicular stress (N/m$^2$), and ε is a longitudinal strain (dimensionless). A unit of the Young's modulus is N/m$^2$.

The Young's modulus E is a numerical value measured based on a technique disclosed, for example, in H. Nakagawa, "Acoustical Materials (2)" (Online) Internet<URL:http://www.noejp/technology/21/21meca2.html>; L. Kelders, W. Lauriks, et al., "Experimental Study of the Dynamic Elastic Moduli of Porous Materials", 11th International FASE Symposium, pp 15-17; or T. Pritz, et al., "Transfer Function Method for Investigating the Complex Modulus of Acoustic Materials: Rod-like Specimen", *Journal of Sound and Vibration* (1982) 81(3), pp 359-376. A method of measuring the Young's modulus E may comprise: fabricating a rod-shaped testing material (sound-absorbing material); fixing one of opposite ends of the testing material to a vibration exciter in a hung manner; attaching two acceleration pickups to the respective ends to measure a vibration acceleration; and deriving a transfer function from the measured vibration acceleration to calculate a Young's modulus. In this case, for example, the vibration exciter is connected to a sound card through a power amplifier, and each of the acceleration pickups is connected to the sound card through a charge amplifier. The sound card is connected to a computer which has a program installed thereon to derive a transfer function from an output of the sound card (vibration acceleration) and calculate a Young's modulus based on the derived transfer function.

Figure 3:
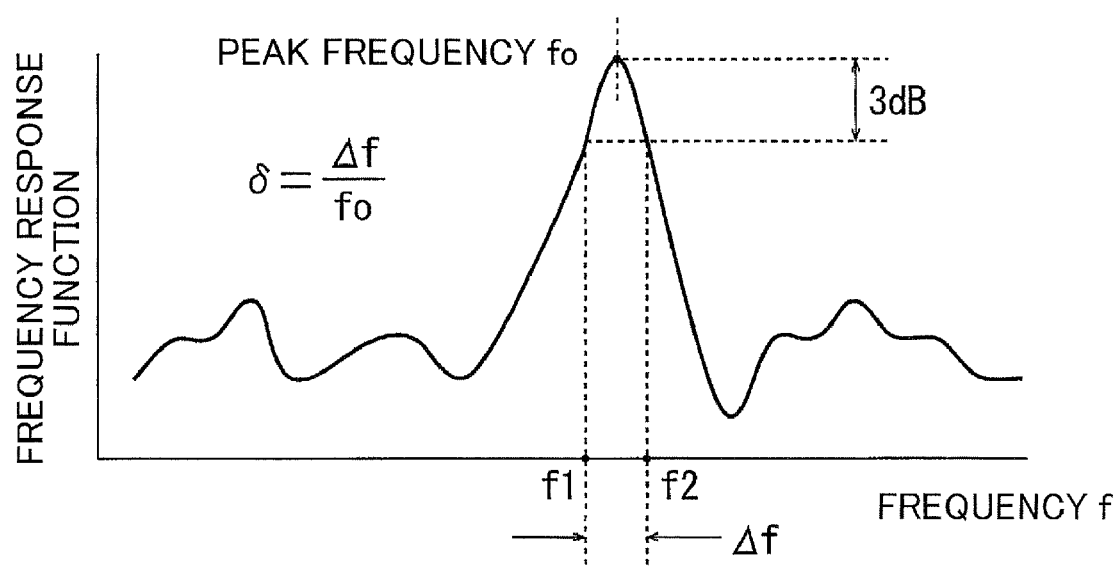
FIG. 3 is a graph for explaining a technique of calculating a loss factor δ based on a half-power bandwidth method.

(A-1-iii-c) The loss factor δ is a measure indicative of a level of vibration attenuation capability of a material when it is subjected to vibration. Specifically, a value of the loss factor δ becomes larger as the material has a higher vibration attenuation capability, and becomes smaller value as the material has a lower vibration attenuation capability. The loss factor δ can be calculated by various methods, such as a half-power bandwidth method. As shown in FIG. 3, in the half-power bandwidth method, the loss factor δ is obtained by reading respective frequencies f1, f2 at two points having a gain less than that at a peak-gain frequency f0 by 3 dB in a frequency response function of a material (sample), and performing calculation using the following formula: δ=Δf/f0, wherein Δf=f1−f2. A unit of the loss factor δ is dimensionless. The frequency response function is calculated by reading the vibration acceleration obtained during the measurement of the Young's modulus E, using a vibration analyzer.

(A-2-i) The sound-absorbing material according to the first embodiment is adjusted to have a flow resistivity R of 3.3×10$^4$ N·s/m$^4$ or more, a Young's modulus E of 1.2×10$^3$ to 2.0×10$^4$ N/m$^2$, and a loss factor δ of 0.12 or less. These ranges are determined based on the aforementioned fact that, in both the low/intermediate-frequency region and the high-frequency region, most of the total contribution rate of all the influence factors to the sound absorption characteristics is occupied by a sum of respective contribution rates of the flow resistivity R, the Young's modulus E and the loss factor δ. Specifically, each of the flow resistivity R, the Young's modulus E and the loss factor δ is set in a range allowing the sound-absorbing material to exhibit high sound absorption characteristics in both the low/intermediate-frequency region and the high-frequency region.

Figure 4:
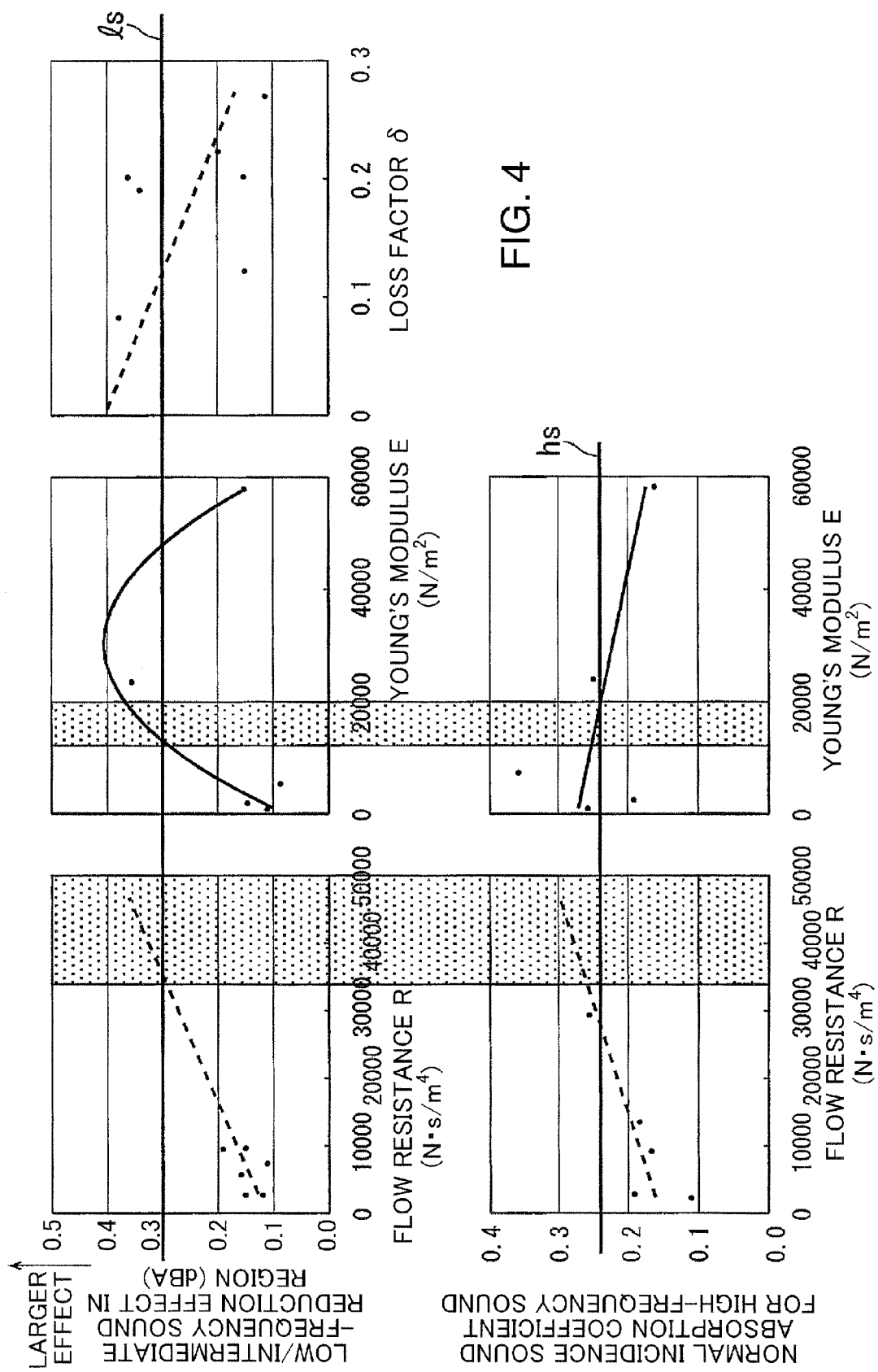
FIG. 4 is graphs for explaining respective influences of the flow resistivity R, the Young's modulus E and the loss factor δ, on absorption of each of the low/intermediate-frequency sound and the high-frequency sound.

(A-2-ii) FIG. 4 shows a result of an experimental test for clarifying respective influences of the flow resistivity R, the Young's modulus E and the loss factor δ, on absorption of each of the low/intermediate-frequency sound and the high-frequency sound. For example, the low/intermediate-frequency sound includes road noise. The road noise means vehicle interior noise caused by vibration generated from vehicle tires serving as a vibration source and transmitted to a passenger compartment, and typically has a frequency of 100 to 800 Hz. For example, the high-frequency sound includes wind noise. The wind noise means a noise caused by air turbulences generated around an outer surface of a vehicle, and typically has a frequency of 1 kHz or more.

Actually, the sound absorption characteristics are determined by an aggregation of the flow resistivity R, the Young's modulus E and the loss factor δ each defined in the above range, i.e., by a sound absorption characteristic function f=f (R, E, δ), and thereby it is difficult to figure out respective influences of the three factors individually. Thus, in order to allow the respective influences of the three factors to be more easily understood sensuously, a relationship between each of the flow resistivity R, the Young's modulus E and the loss factor δ, and the sound absorption characteristics in each of the frequency regions was clarified by a multiple regression analysis method. The result is shown in FIG. 4. In each of the graphs illustrated in FIG. 4, the vertical axis represents a sound absorption effect, and the horizontal axis represents one of the three factors. In FIG. 4, a sound absorption effect for the low/intermediate-frequency sound is expressed as a reduction in A-weighted sound pressure level (dBA). The A-weighted sound pressure level is measured using a noise meter or the like. In FIG. 4, a sound absorption effect for the high-frequency sound is expressed as a normal incidence sound absorption coefficient. The normal incidence sound absorption coefficient means a sound absorption coefficient measured using a measurement device called "impedance tube (acoustic tube or sound tube)" when a sound enters into a sound-absorbing material at a right angle therewith (at an incident angle of zero degree). The measurement of the normal incidence sound absorption coefficient is carried out according to a measuring procedure based on an acoustic tube (defined by "JIS A 1405" or "ISO 10534"). In one specific example, the normal incidence sound absorption coefficient is calculated based on gain and phase data obtained from a transfer function between two microphones installed in the acoustic tube.

(A-2-iii) Respective influences of the three factors on absorption of each of the low/intermediate-frequency sound and the high-frequency sound are shown in FIG. 4.

As to the flow resistivity R, the sound absorption characteristic for the sounds in both the frequency regions, i.e., for both the low/intermediate-frequency sound and the high-frequency sound, was represented as a straight characteristic line indicating that the sound absorption effect (noise reduction effect) is more enhanced as a value of the flow resistivity R becomes larger.

As to the Young's modulus E, the sound absorption characteristic for the low/intermediate-frequency sound was represented as an upwardly-convex characteristic curve which shows that there is an appropriate range for obtaining a desired sound absorption effect. In contrast, the sound absorption characteristic for the high-frequency sound was represented as a straight characteristic line indicating that the sound absorption effect is more enhanced as a value of the Young's modulus E becomes smaller.

As to the loss factor δ, the sound absorption characteristic for the low/intermediate-frequency sound was represented as a straight characteristic line indicating that the sound absorption effect is more enhanced as a value of the loss factor δ becomes smaller. A data acquisition for the influence of the loss factor δ on absorption of the high-frequency sound was omitted, because the contribution rate of the loss factor δ to absorption of the high-frequency sound is relatively small, as shown in FIG. 2. In other words, it is believed that it is only necessary for the loss factor δ to perform adjustment (tuning) for enhancing only the sound absorption effect for the low/intermediate-frequency sound.

A sound-absorbing material (sample) used for clarifying the sound absorption characteristics in FIG. 4 had a thickness of 10 mm and an area of 0.95 m$^2$.

(A-2-iv) In view of the above results illustrated in FIG. 4, the respective ranges of the three factors for enhancing the sound absorption capability over the range of the low/intermediate-frequency region to the high-frequency region can be determined as follows.

Firstly, as to the sound absorption characteristics for the high-frequency sound, a reference line hs was set, and a range beyond the reference line hs was determined as a notable range. Secondly, as to the sound absorption characteristics for the low/intermediate-frequency sound, a reference line ls was set, and a range beyond the reference line ls was determined as a notable range. Thirdly, a range common to the two notable ranges was determined as the range of each of the three factors for enhancing the sound absorption capability over the range of the low/intermediate-frequency region to the high-frequency region. The reference line hs is set to allow the normal incidence sound absorption coefficient to be 0.25 or more. More specifically, the reference line hs is set at a level which allows wind noise in a saloon or hatchback vehicle with the sound-absorbing material to be enhanced by 2.0 dBA, as compared with a saloon or hatchback vehicle devoid of the sound-absorbing material (this level is equivalent to a sound absorption capability of an existing top-performance sound-absorbing material). The reference line ls is set at a level which allows road noise in a saloon or hatchback vehicle with the sound-absorbing material to be enhanced by 0.3 dBA, as compared with a saloon or hatchback vehicle devoid of the sound-absorbing material.

Based on the above results, it was proven that the flow resistivity R, the Young's modulus E and the loss factor δ should be set at $3.3 \times 10^4$ N·s/m$^4$ or more, in the range of $1.2 \times 10^3$ to $2.0 \times 10^4$ N/m$^2$ and at 0.12 or less, respectively. Thus the sound-absorbing capability can be enhanced over a wide range of the low/intermediate-frequency region to the high-frequency region. As to the loss factor δ, only the data about the low/intermediate-frequency sound is used for the aforementioned reason.

Figure 6:
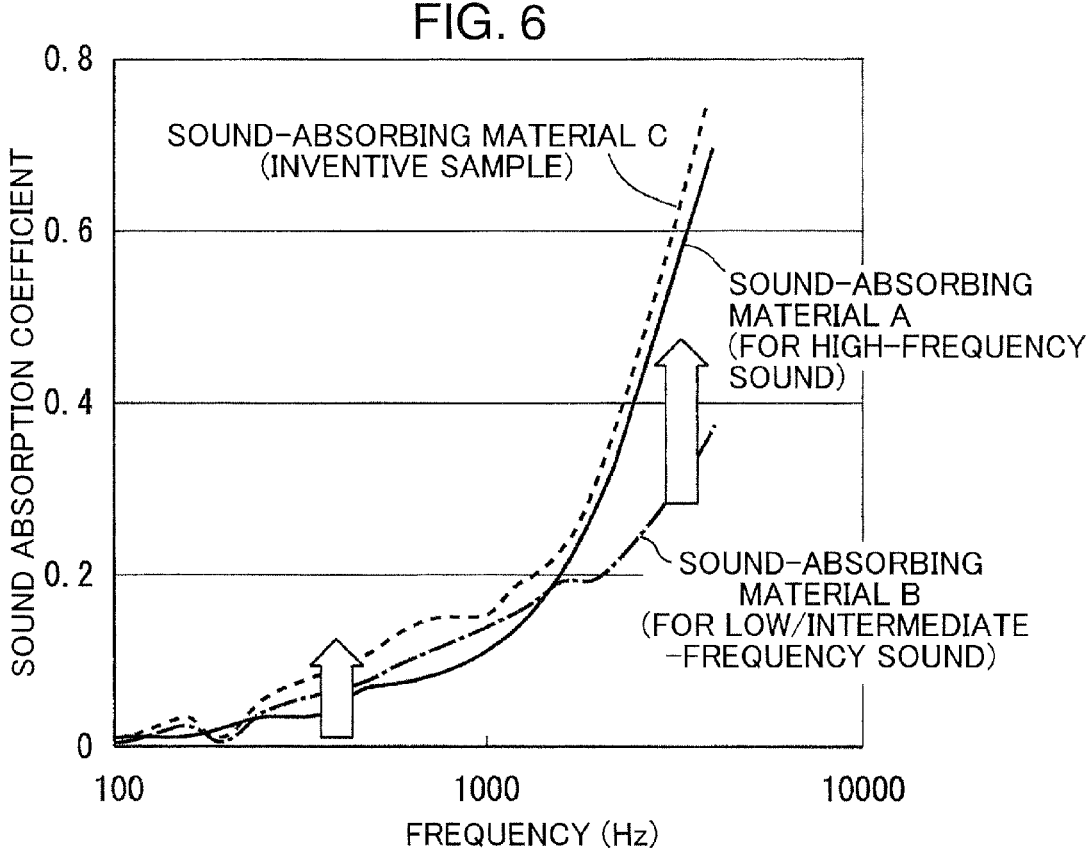
FIG. 6 is a graph showing a sound absorption coefficient of the sound-absorbing material according to the first embodiment, in the range of a low/intermediate-frequency region to a high-frequency region.
Figure 7:
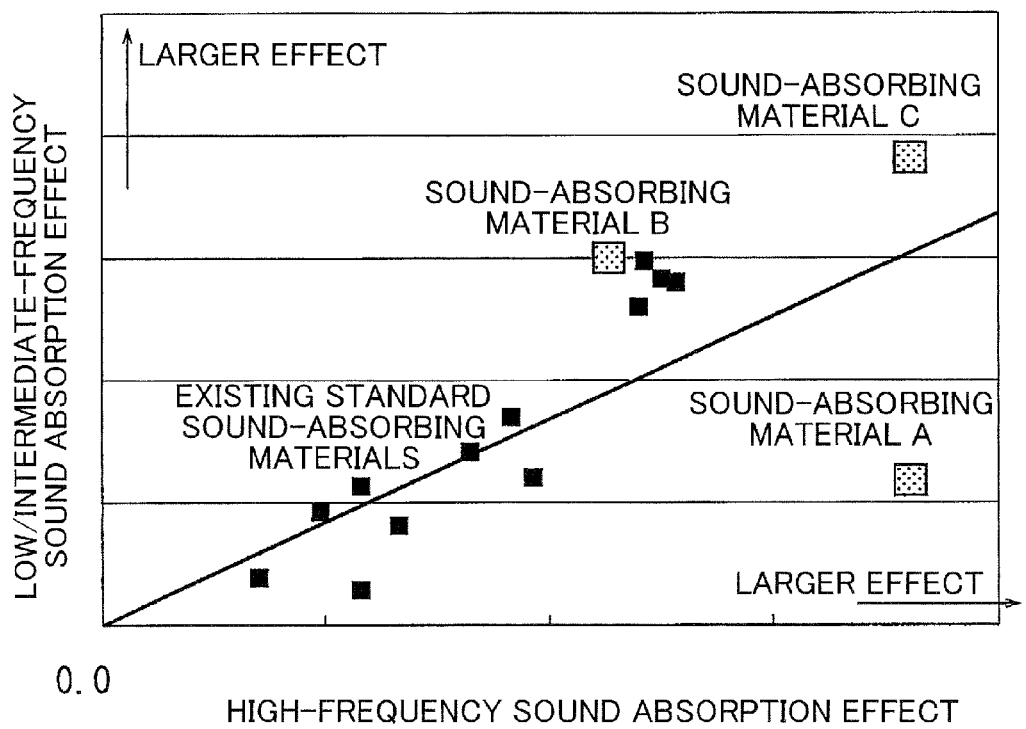
FIG. 7 is a graph for explaining a sound absorption effect of the sound-absorbing material according to the first embodiment, for the low/intermediate-frequency sound and the high-frequency sound.

(A-2-v) Then, an experimental test for verifying the above ranges (each of these ranges will hereinafter be referred to as "the desired range") was carried out using three types of sound-absorbing materials A, B, C illustrated in FIG. 5. FIGS. 6 and 7 show results of the verification test.

The sound-absorbing material A is a high-frequency sound-absorbing material (existing top-performance sound-absorbing material). Specifically, as shown in FIG. 5, each of the Young's modulus E and the loss factor δ of the sound-absorbing material A is out of the desired range, although the flow resistivity R of the sound-absorbing material A falls within the desired range. The sound-absorbing material B is a low/intermediate-frequency sound-absorbing material (existing top-performance sound-absorbing material). Specifically, as shown in FIG. 5, the flow resistivity R of the sound-absorbing material B is out of the desired range, although each of the Young's modulus E and the loss factor δ of the sound-absorbing material A falls within the desired range. Each of the flow resistivity R, the Young's modulus E and the loss factor δ of the sound-absorbing material C falls within the desired range. That is, the sound-absorbing material C is an inventive example (sound-absorbing material of the present invention) which meets all the desired ranges, and each of the sound-absorbing materials B, C is a comparative example where at least one of the flow resistivity R, the Young's modulus E and the loss factor δ is out of the desired range.

FIG. 6 shows a sound absorption coefficient measured when a frequency of a sound is changed from the low-frequency region to the high-frequency region. FIG. 7 is a graph for explaining a sound absorption effect for the low/intermediate-frequency sound and the high-frequency sound. Specifically, FIG. 7 shows a coordinate system having one coordinate axis representing a high-frequency sound absorption effect and the other coordinate axis representing a low/intermediate-frequency sound absorption effect, wherein respective sound absorption effects of each sound-absorbing material for a certain low/intermediate-frequency sound (e.g., sound having a frequency of 100 to 800 Hz) and a certain high-frequency sound (e.g., sound having a frequency of 1 kHz or more) are experimentally clarified, and the sound-absorbing material is plotted at a coordinate position corresponding to the clarified sound absorption effects.

(A-2-vi) As seen in FIG. 6, in the low/intermediate-frequency region (100 to 800 Hz), the sound-absorbing material C had a sound absorption coefficient greater than that of the sound-absorbing material B which is an existing top-performance sound-absorbing material as a low/intermediate-frequency sound-absorbing material. Further, in the high-frequency region (greater than 800 Hz), the sound-absorbing material C had a sound absorption coefficient greater than that of the sound-absorbing material A which is an existing top-performance sound-absorbing material as a high-frequency sound-absorbing material. Thus, the sound-absorbing material C exhibited remarkably enhanced sound absorption characteristics in the entire frequency region.

As seen in FIG. 7, the sound-absorbing material C exhibited high sound absorption characteristics for both the high-frequency sound and the low/intermediate-frequency sound. In contrast, the sound-absorbing material A as a high-frequency sound-absorbing material exhibited high sound absorption characteristics for only the high-frequency sound, and the sound-absorbing material B as a low/intermediate-frequency sound-absorbing material exhibited high sound absorption characteristics for only the low/intermediate-frequency sound. In FIG. 7, the mark ■ indicates an existing standard sound-absorbing material.

(A-3-i) The sound-absorbing material according to the first embodiment is produced, for example, by pressing a fiber mixture including matrix fibers (hereinafter referred to simply as "fibers" on a case-by-case basis) and binder fibers, under heating, to form the fiber mixture into a given shape, such as a plate shape. That is, the sound-absorbing material is produced by forming fibers into a given shape while thermally bonding the fibers together by binder fibers.

In the sound-absorbing material according to the first embodiment, respective values of the three physical properties i.e., the flow resistivity R, the Young's modulus E and the loss factor δ, are effectively adjusted by specifications of the fibers as a raw material of the sound-absorbing material, a production method for the sound-absorbing material, and others, as will be specifically described below.

(A-3-ii) Specifications of Matrix Fibers

Figures 8, 9:
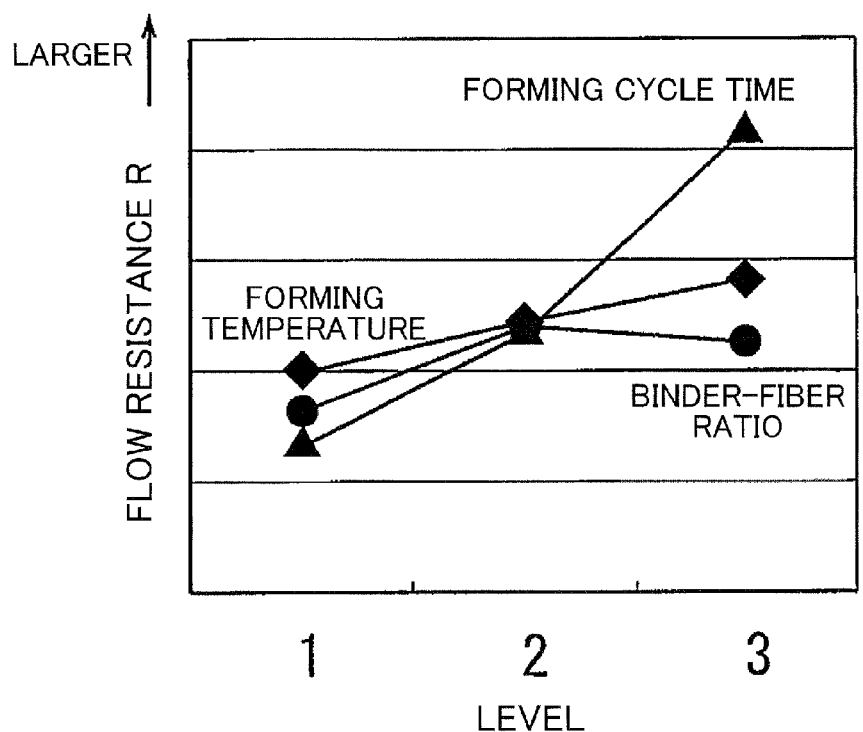
FIG. 8 is a table for explaining an influence of specifications of fibers on each of the flow resistivity R, the Young's modulus E and the loss factor δ.
FIG. 9 is a graph for explaining respective influences of a forming cycle time, a forming temperature and a binder-fiber ratio, on the flow resistivity R.

A parameter capable of changing values of the three physical properties based on the fibers may include a raw material of the fibers (type of the fibers), a presence or absence of pores in fiber cross-section (hollow or solid; percentage of hollowness) and a crimp in the fibers (crimping rate). FIG. 8 is a table showing a result of an experimental test for clarifying a range of each of the physical property values while varying each of the parameters independently. As seen in FIG. 8, an influence of the fiber specifications on each of the flow resistivity R, the Young's modulus E and the loss factor δ is as follows.

The crimp in the fibers had a large influence on variability in the flow resistivity R. In contrast, the type of the fibers and the presence or absence of pores in fiber cross-section had an insignificant influence on variability in the flow resistivity R. Specifically, fibers having crimp (i.e., crimped fibers) was effective in increasing the flow resistivity R.

The type of the fibers and the presence or absence of pores in fiber cross-section had a large influence on variability in the Young's modulus E. In contrast, the crimp in the fibers had an insignificant influence on variability in the Young's modulus E. Specifically, the use of polyethylene terephthalate (PET) as a raw material of the fibers was effective in increasing the Young's modulus E. Solid fibers having almost no pore in fiber cross-section was also effective in increasing the Young's modulus E. Further, the use of acrylic resin as a raw material of the fibers was effective in reducing the Young's modulus E. Hollow fibers having pores in fiber cross-section was also effective in reducing the Young's modulus E.

The type of the fibers and the presence or absence of pores in fiber cross-section had a large influence on variability in the loss factor δ. In contrast, the crimp in the fibers had an insignificant influence on variability in the loss factor δ. Specifically, the use of polyethylene terephthalate (PET) as a raw material of the fibers was effective in reducing the loss factor δ. Solid fibers having almost no pore in fiber cross-section was also effective in reducing the loss factor δ.

Based on the above knowledge about the fiber specifications, each of the flow resistivity R, the Young's modulus E and the loss factor δ of the sound-absorbing material according to the first embodiment is effectively adjusted.

(A-3-iii) Production Method for Sound-Absorbing Material

The sound-absorbing material according to the first embodiment is produced by pressing a fiber mixture including matrix fibers and binder fibers, under heating, to form the fiber mixture into a given shape, such as a plate shape. A parameter capable of changing values of the flow resistivity R, the Young's modulus E and the loss factor δ may include a forming temperature, a forming cycle time, and a binder-fiber ratio (i.e., a ratio of the binder fibers to the entire fiber mixture). The binder fibers may comprise fibers capable of allowing the matrix fibers to be thermally bonded together therethrough. Specifically, the binder fibers may comprise fibers having a melting point less than that of the matrix fibers. In the following experimental test, fibers made of low-melting point polyethylene terephthalate (PET) were used as the binder fibers.

Figure 10:
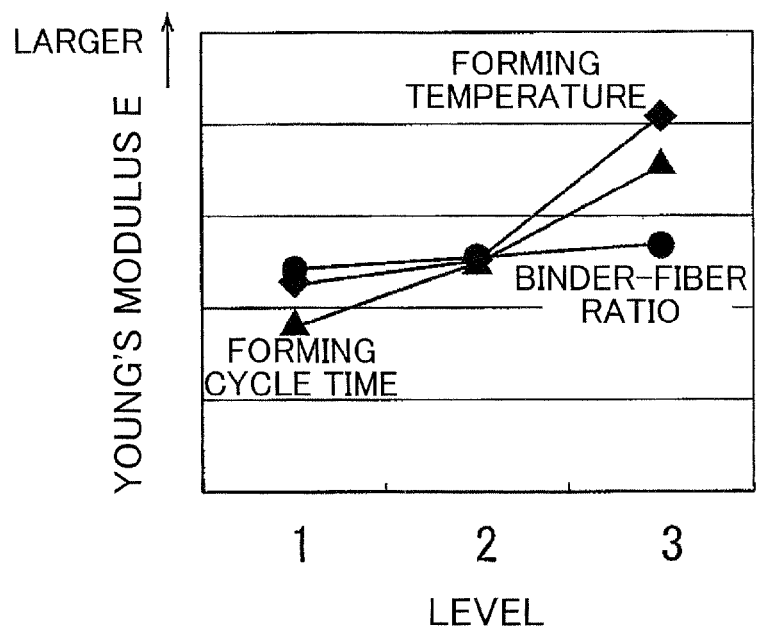
FIG. 10 is a graph for explaining respective influences of the forming cycle time, the forming temperature and the binder-fiber ratio, on the Young's modulus E.
Figure 11:
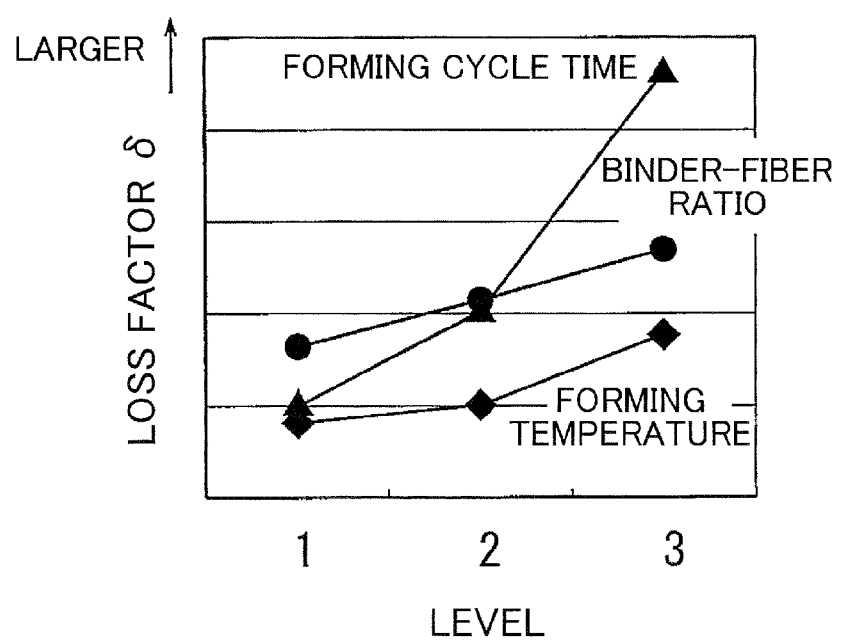
FIG. 11 is a graph for explaining respective influences of the forming cycle time, the forming temperature and the binder-fiber ratio, on the loss factor δ.

FIGS. 9 to 11 are graphs showing results of experimental tests carried out under conditions illustrated in FIG. 12 to clarify respective influences of the above parameters on the flow resistivity R, the Young's modulus E and the loss factor δ. The results illustrated in FIGS. 9 to 11 were obtained under a condition that, when the influence of a specific one of the parameters is clarified, a value of the specify parameter is variously changed while fixing each of the remaining parameters at a constant value.

(A-3-iii-a) As seen in FIG. 9, respective influences of the forming temperature, the forming cycle time and the binder-fiber ratio on the flow resistivity R were as follows. A value of the flow resistivity R became larger as each of the forming temperature and the forming cycle time was increased from a level 1 to a level 3. This shows that each of the forming temperature and the forming cycle time is effective in adjusting the value of the flow resistivity R. In contrast, even if the binder-fiber ratio was increased from the level 1 to the level 3, the value of the flow resistivity R was not significantly changed. This shows that the binder-fiber ratio is not effective as a means to adjust the value of the flow resistivity R.

(A-3-iii-b) As seen in FIG. 10, respective influences of the forming temperature, the forming cycle time and the binder-fiber ratio on the Young's modulus E were as follows. A value of the Young's modulus E became larger as each of the forming temperature, the forming cycle time and the binder-fiber ratio was increased from the level 1 to the level 3. This shows that each of the forming temperature, the forming cycle time and the binder-fiber ratio is effective in adjusting the value of the Young's modulus E.

(A-3-iii-c) As seen in FIG. 11, respective influences of the forming temperature, the forming cycle time and the binder-fiber ratio on the loss factor δ were as follows. A value of the loss factor δ became larger as each of the forming temperature, the forming cycle time and the binder-fiber ratio was increased from the level 1 to the level 3. This shows that each of the forming temperature, the forming cycle time and the binder-fiber ratio is effective in adjusting the value of the loss factor δ.

Based on the above knowledge about the sound-absorbing material production method, each of the flow resistivity R, the Young's modulus E and the loss factor δ of the sound-absorbing material according to the first embodiment is effectively adjusted.

The sound-absorbing material according to the first embodiment is obtained by pressing the fiber mixture including the matrix fibers and the binder fibers, under heating, to form the fiber mixture into a given shape, wherein the type of the matrix fibers, the percentage of hollowness of the matrix fibers, the crimping rate of the matrix fibers, the forming temperature, the forming cycle time, and the ratio of the binder fibers to the entire fiber mixture, are adjusted to allow each of the flow resistivity R, the Young's modulus E and the loss factor δ to fall within the desired range.

Specifically, the crimping rate is adjusted to allow the flow resistivity R to be set at $3.3 \times 10^4$ N·s/m$^4$ or more. In addition, a mixing ratio between solid fibers made of PET and hollow fibers made of acrylic resin is adjusted to allow the Young's modulus E and the loss factor δ to be set in the range of $1.2 \times 10^3$ to $2.0 \times 10^4$ N/m$^2$ and at 0.12 or less, respectively. Furthermore, the forming temperature, the forming cycle time, and the ratio of the binder fibers to the entire fiber mixture are adjusted to allow the flow resistivity R, the Young's modulus E and the loss factor δ to be set at $3.3 \times 10^4$ N·s/m$^4$ or more, in the range of $1.2 \times 10^3$ to $1.2 \times 10^3$ to $2.0 \times 10^4$ N/m$^2$ and at 0.12 or less, respectively.

[B] Sound-Absorption Structure

A sound-absorption structure according to a second embodiment of the present invention will be described below.

The sound-absorption structure according to the second embodiment can be formed by installing the sound-absorbing material according to the first embodiment in a flat sound-absorbing space defined between a pair of plate members disposed in opposed relation to each other. Specifically, the sound-absorption structure according to the second embodiment comprises a pair of plate members disposed in opposed relation to each other to define a sound-absorbing space therebetween, and a sound-absorbing material disposed within the sound-absorbing space, wherein one of the pair of plate members (hereinafter referred to as "first plate member") is a vibrating plate member having a vibratable portion adapted to be brought into micro-vibration by a wave motion in a low/intermediate-frequency region, and the sound-absorbing material is disposed at a position facing the vibratable portion, wherein the sound-absorbing material having a flow resistivity R of $3.3 \times 10^4$ N·s/m$^4$ or more, a Young's modulus E of $1.2 \times 10^3$ to $2.0 \times 10^4$ N/m$^2$, and a loss factor $\delta$ of 0.12 or less. The following description will be made based on one example where the sound-absorption structure is formed in a roof portion of a vehicle.

Figure 13:
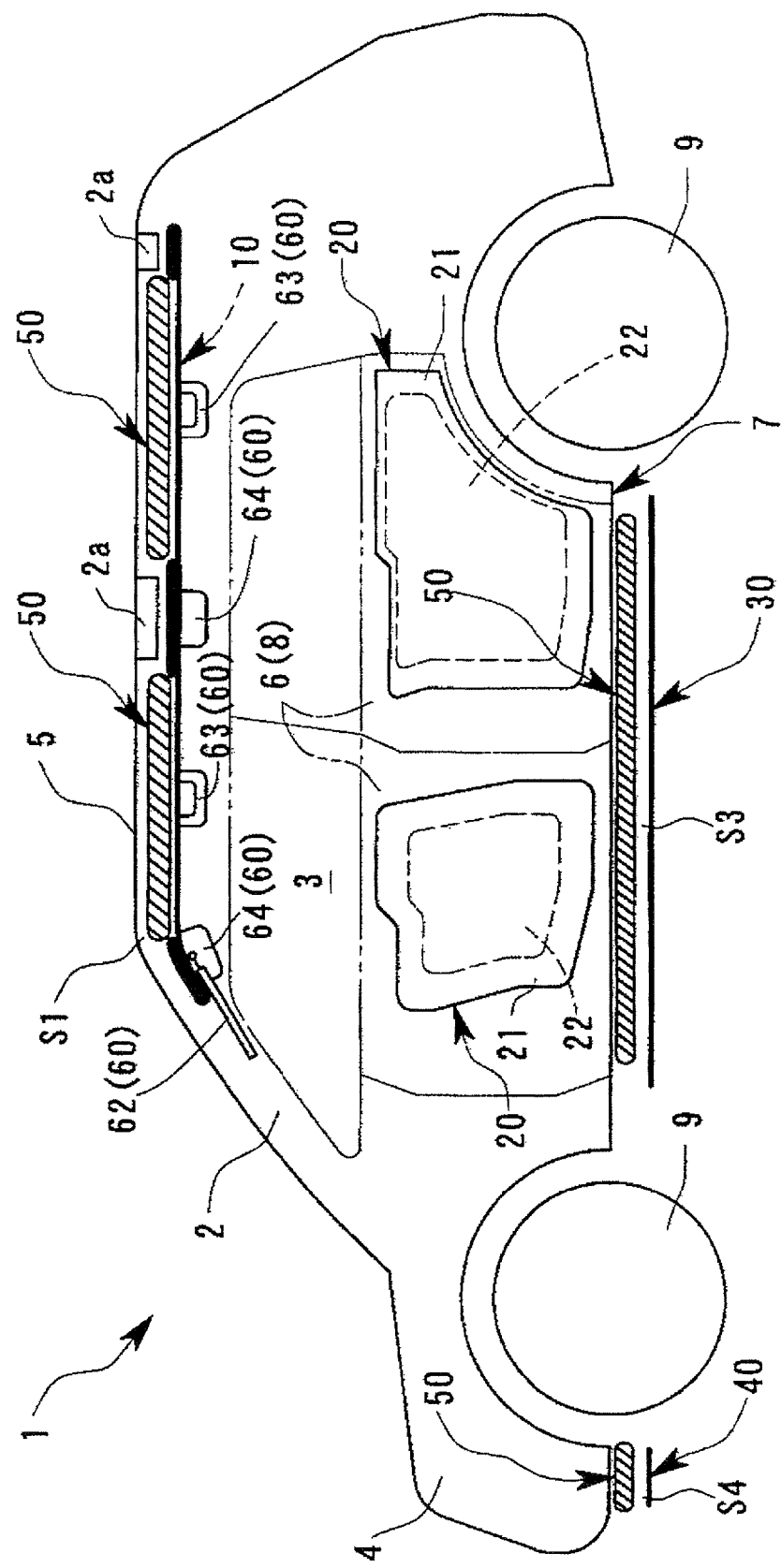
FIG. 13 is a schematic diagram showing a sound-absorbing structure according to a second embodiment of the present invention, wherein the sound-absorbing structure is incorporated in a vehicle.
Figure 14:
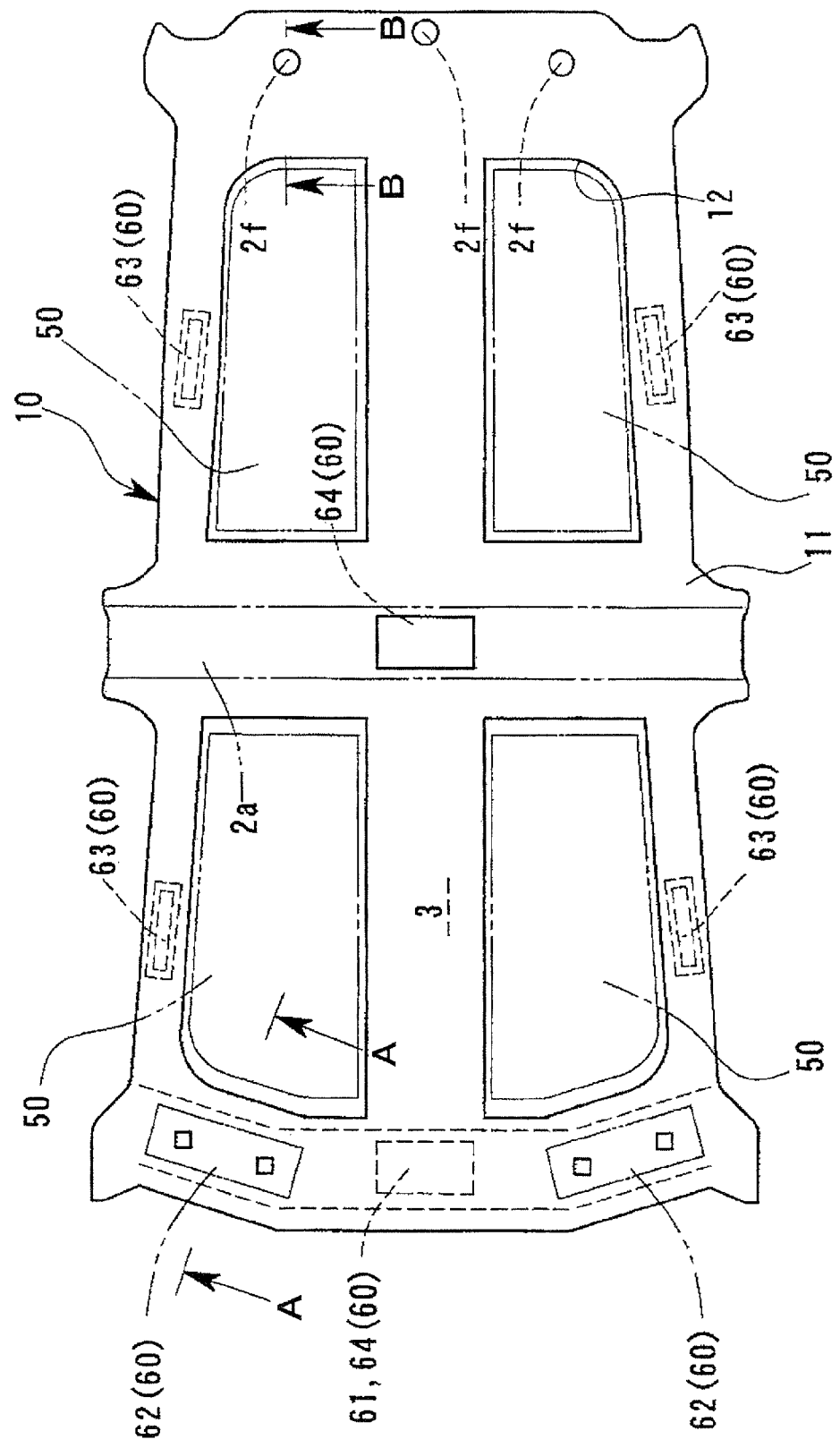
FIG. 14 is a top plan view showing a roof trim as one example of the sound-absorbing structure.

As shown in FIG. 13, a vehicle 1 has a vehicle body 2 formed to define a passenger compartment 3 therein. The vehicle 1 includes a roof trim 10 which is arranged above the passenger compartment 3 to serve as an interior trim member defining a top plane of the passenger compartment 3. Specifically, the roof trim 10 is arranged to extend approximately along a roof panel 5 disposed above and in spaced-apart relation to the roof trim 10, so that a sound-absorbing space S1 is defined between the roof trim 10 and the roof panel 5. The roof trim 10 corresponds to the aforementioned first plate member, and the roof panel 5 corresponds to the other plate member (hereinafter referred to as "second plate member"). The roof trim 10 is formed to have a certain level of hardness, and serve as a vibrating plate member having a vibratable portion adapted to be brought into micro-vibration by a wave motion in the low/intermediate-frequency region, e.g., a low/intermediate-frequency sound propagated into the passenger compartment 3. Specifically, as shown in FIG. 14, the roof trim 10 has an anchor portions 11 exhibiting a relatively high stiffness (e.g., Young's modulus: $1.4 \times 10^5$ to $1.9 \times 10^5$ N/m$^2$), and four vibratable portions 12 each formed to have a wall thickness less than that of the anchor portion 11 and exhibit a relatively high flexibility [i.e., a stiffness less than that of the anchor portion 11 (e.g., Young's modulus: $8.0 \times 10^4$ to $1.1 \times 10^5$ N/m$^2$)]. In the second embodiment, the anchor portion 11 has four area each formed in a generally grid shape having 2×2 grids arranged to surround a corresponding one of the vibratable portions 12.

Figure 15:
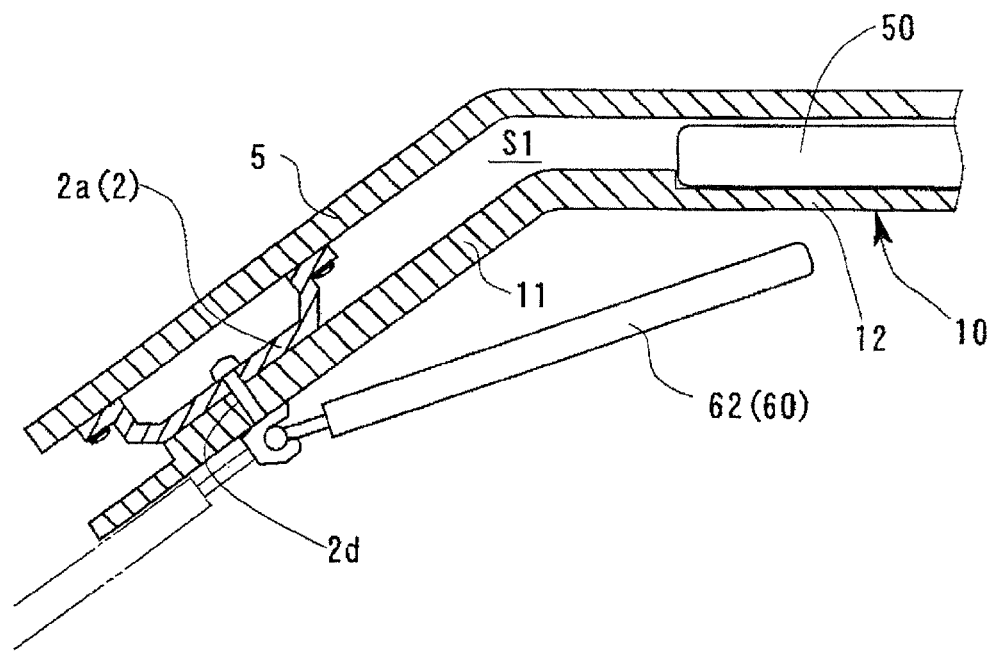
FIG. 15 is a sectional view taken along the line A-A in FIG. 14.
Figure 16:
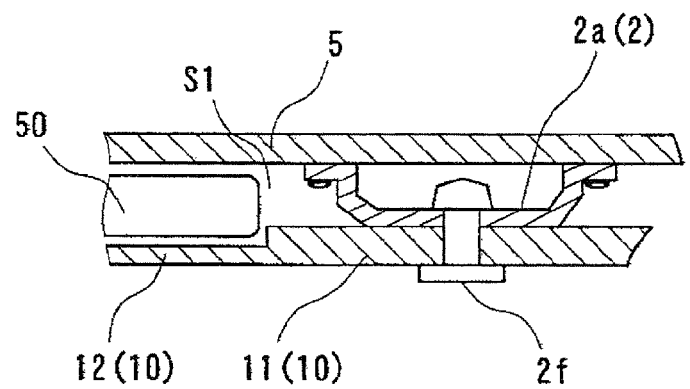
FIG. 16 is a sectional view taken along the line B-B in FIG. 14.

The anchor portion 11 has a relatively high stiffness, and therefore one or more vehicle interior components 60 are mounted to the anchor portion 11. For example, the interior components 60 may include a rearview mirror 61, a sun visor 62, an assist grip 63, and an interior lamp 64. Each of the interior components 60 has the same structure as that of a conventional type, and its description will be omitted. As shown in FIGS. 14 to 16, each of the interior components 60 is also mounted to a cross member 2a extending inside the sound-absorbing space S1 or the like, as well as the anchor portion 11. As shown in FIG. 14, a fastener 2f is provided as a means to fasten an outer peripheral region of a rear portion of the roof trim 10 to the cross member 2a or the like. A clamp 2d is provided as a means to fasten the sun visor 62 to the cross member 2a together with the roof trim 10.

Each of the vibratable portions 12 is formed as a concave portion created by partially reducing a wall thickness of the roof trim 10 on the side of the sound-absorbing space S1. The sound-absorbing material according to the first embodiment (hereinafter referred to as "desired sound-absorbing material") is placed in each of the concave portions, as shown in FIGS. 14 to 16. In this manner, the sound-absorbing structure is formed.

This sound-absorbing structure is designed to increase a specific velocity component of a particle velocity in a direction along the roof trim 10 within the flat sound-absorbing space S1 so as to allow the desired sound-absorbing material to effectively absorb the air particles (i.e., effectively absorb a sound). This mechanism will be more specifically described below.

Figure 17:
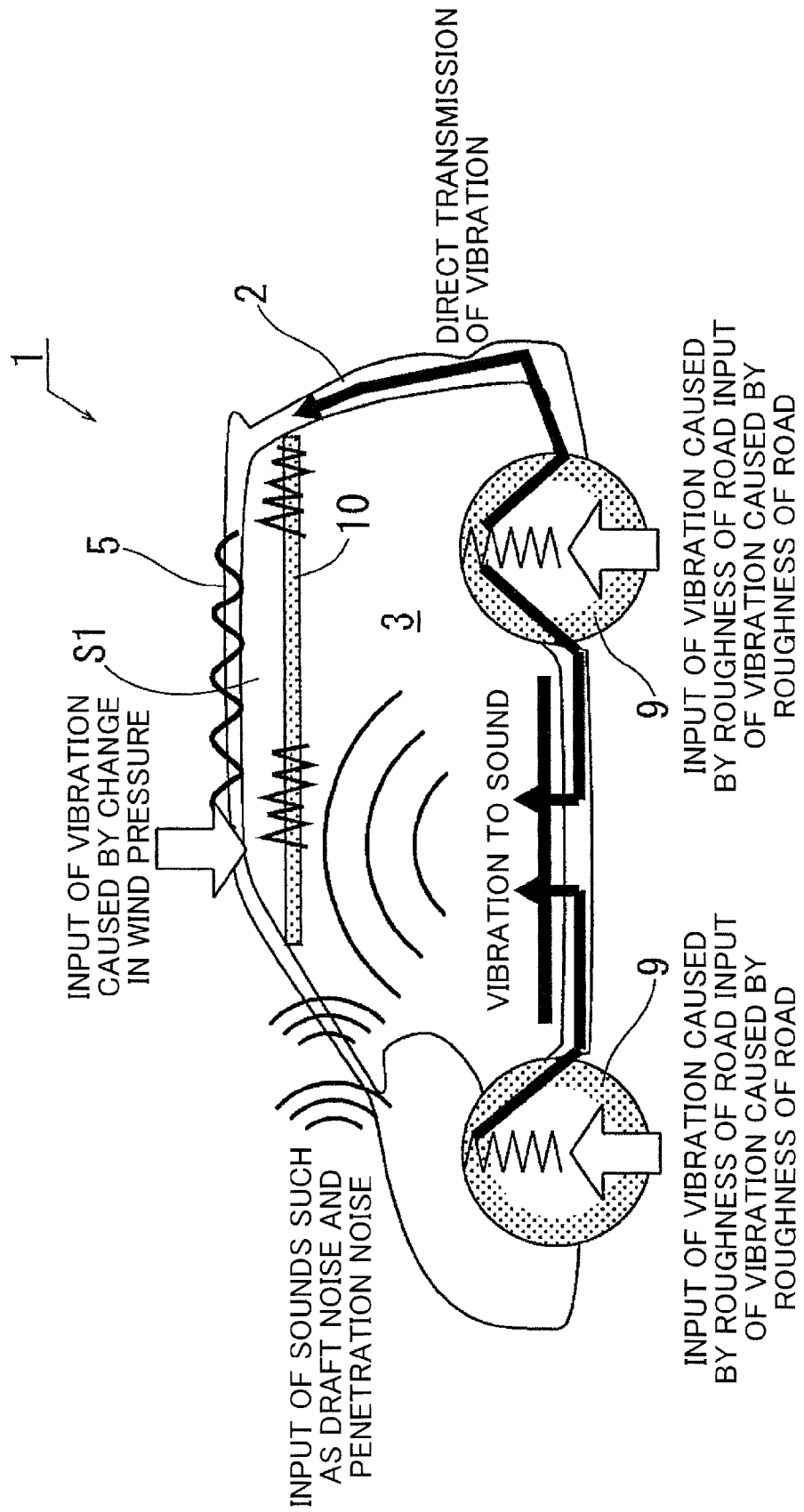
FIG. 17 is a schematic diagram for explaining a microvibration in a roof trim of a vehicle.

As shown in FIG. 17, during running of the vehicle 1, a roughness of a road is input into the vehicle body 2 via a suspension and others in the form of vibration. In addition, a change in wind pressure is input into the vehicle body 2 in the form of vibration. Then, these vibrations are directly transmitted to the roof trim 10. The vibration input from the road to the vehicle body 2 is also transmitted into the passenger compartment 3 in the form of a sound wave. Furthermore, draft noise and penetration noise are input into the passenger compartment 3. A sound wave (frequency: 100 to 800 Hz) of such noises collides with the roof trim 10. Thus, the roof trim 10 will be brought into micro-vibration (vibration velocity: ~2.1 mm/s). The micro-vibration of the roof trim 10 is propagated to air in the sound-absorbing space S1. The micro-vibration propagated to the air causes a phenomenon that an air particle velocity is distributed along the roof trim 10 (a phenomenon that a specific velocity component of a particle velocity in a direction along the roof trim 10 is generated).

The desired sound-absorbing material 50 is operable to receive the air particles having the high particle velocity so as to absorb a sound wave. Each of the vibratable portions 12 is set to have a stiffness fairly less than that of the anchoring portion 11, i.e., have flexibility, so as to facilitate the generation of micro-vibration. Thus, based on the vibration from the vehicle body 2 and the sound wave in the passenger compartment 3, the micro-vibration in each of the vibratable portions is accelerated to increase a horizontal velocity component of the particle velocity within the sound-absorbing space S1. This makes it possible to more enhance the low/intermediate-frequency sound absorption effect of the desired sound-absorbing material.

Figure 18:
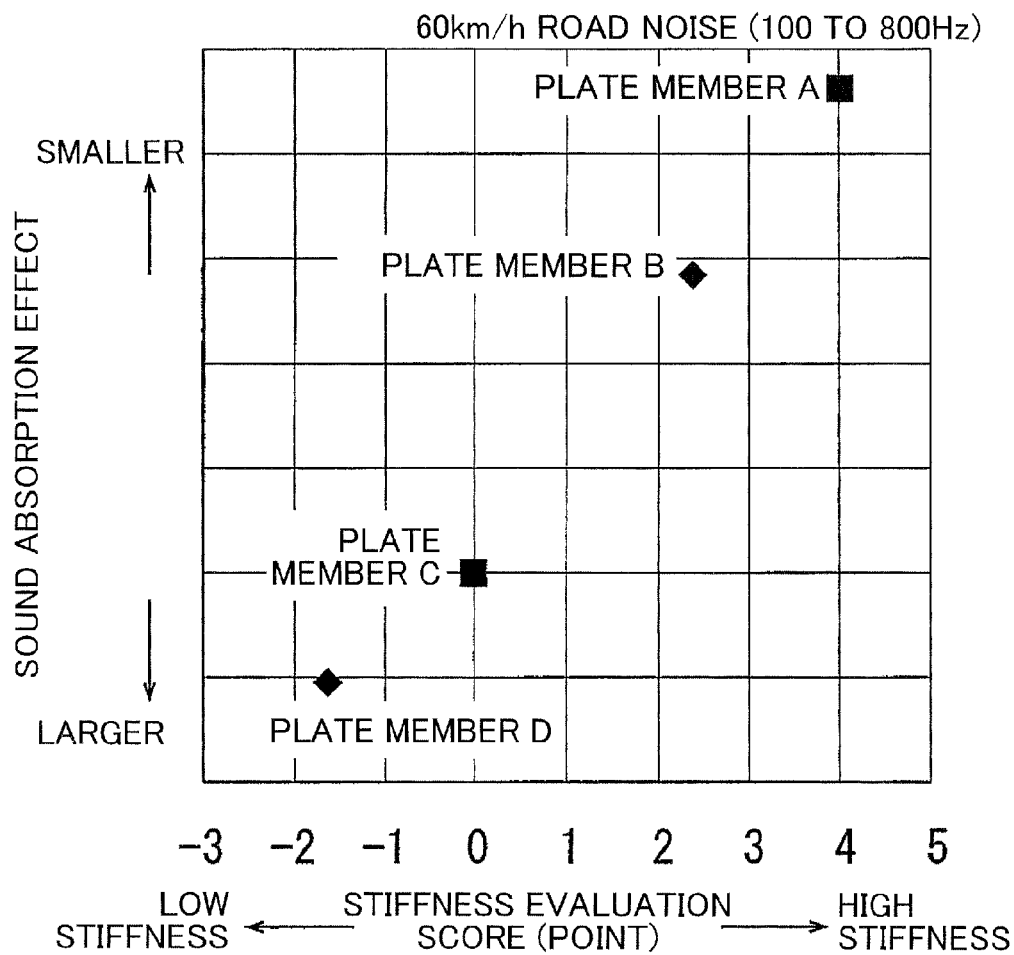
FIG. 18 is a graph showing an influence of a stiffness on a sound absorption effect for the low/intermediate-frequency sound.
Figure 19:
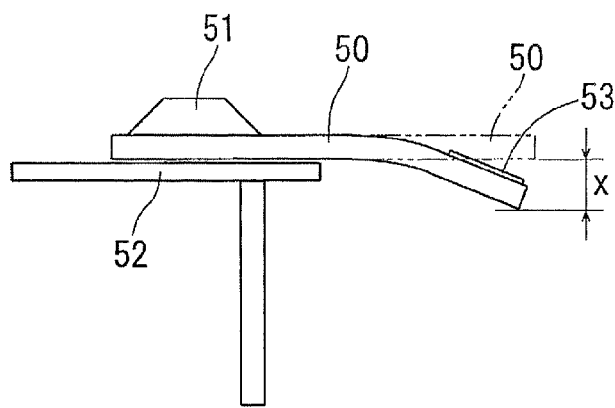
FIG. 19 is a schematic diagram for explaining an evaluation method of a stiffness of a plate member which is a sample used in FIG. 18.

FIG. 18 shows a result of an experimental test for clarifying a relationship between the stiffness of the plate member (roof trim) and the low/intermediate-frequency sound absorption effect to verify the above phenomenon of the vibratable portion 12 of the roof trim 10. In this test, the low/intermediate-frequency sound was road noise occurring when a vehicle is run at 60 km/h, and typically having a frequency of 100 to 800 Hz. The result illustrated in FIG. 18 showed that the low/intermediate-frequency sound absorption effect is more enhanced as the stiffness of the plate member becomes lower. In this test, the stiffness of the plate member was evaluated as follows. As shown in FIG. 19, each of a plurality of plate members 50 each prepared as a sample was placed on a table 52 in such a manner that a first end thereof is fixed on the table 52 by a weight 51 and a second end thereof protrudes from the table 52, and a load weight (constant load) was placed on the second end to cause a bending in the second end. Then, one of the plate members 50 having a larger bending deflection x was evaluated that it has a lower stiffness.

Figure 20:
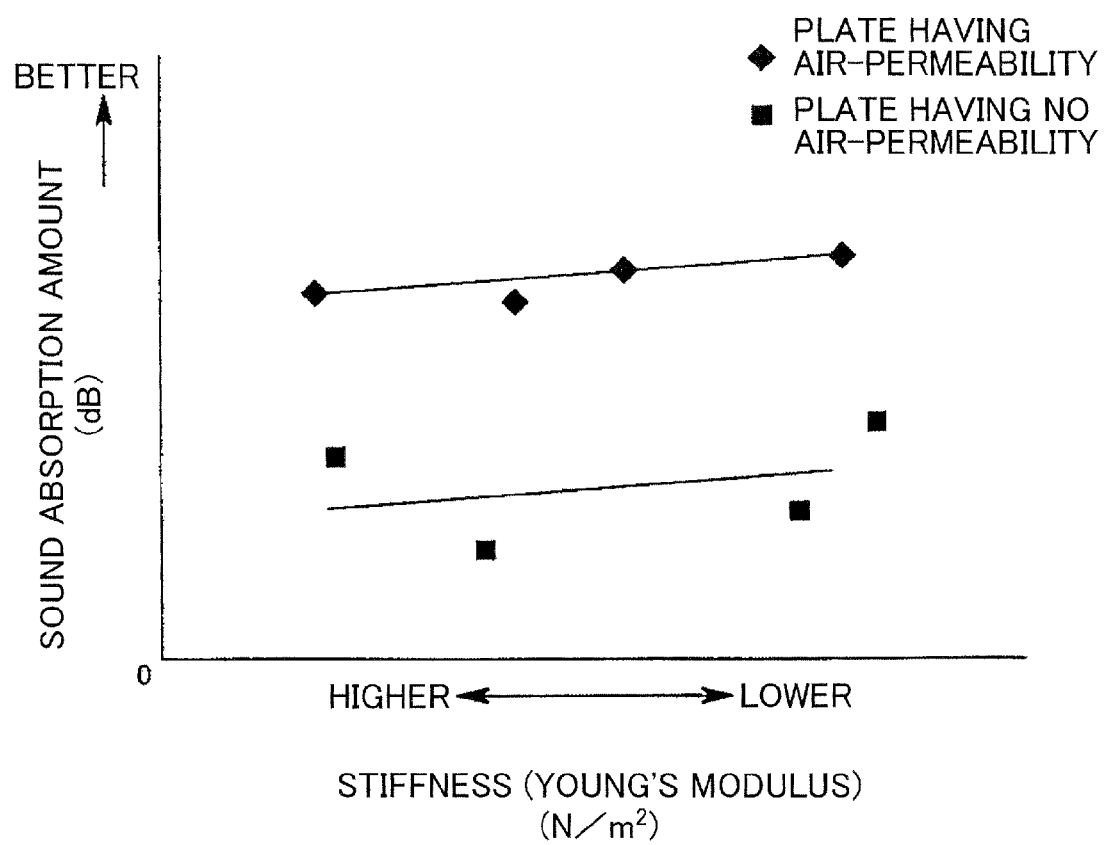
FIG. 20 is a graph showing an influence of the stiffness on a sound absorption effect for the high-frequency sound.

Another experimental test was also carried out to clarify a relationship between the stiffness of the roof trim 10 and the high-frequency sound absorption effect so as to clarify an influence of the vibratable portion 12 of the roof trim 10 on the high-frequency sound absorption effect. FIG. 20 shows a result of the test. The result illustrated in FIG. 20 showed that, as to the high-frequency sound, a difference in the stiffness has an insignificant influence on a sound absorption amount. Thus, it was verified that a deterioration in the high-frequency sound absorption effect can be suppressed at a significantly low level even if the vibratable portion 12 is provided, or the stiffness of the vibratable portion 12 is lowered, to enhance the low/intermediate-frequency sound absorption effect. In FIG. 20, the sound absorption amount means an amount of attenuated sound energy. More specifically, the sound absorption amount means a physical quantity evaluated by a difference between an intensity of sound entering into a sound-absorbing material and an intensity of sound reflected by the sound-absorbing material. The sound intensity is measured using a sound-collecting microphone placed in the passenger compartment 3.

Figure 21:
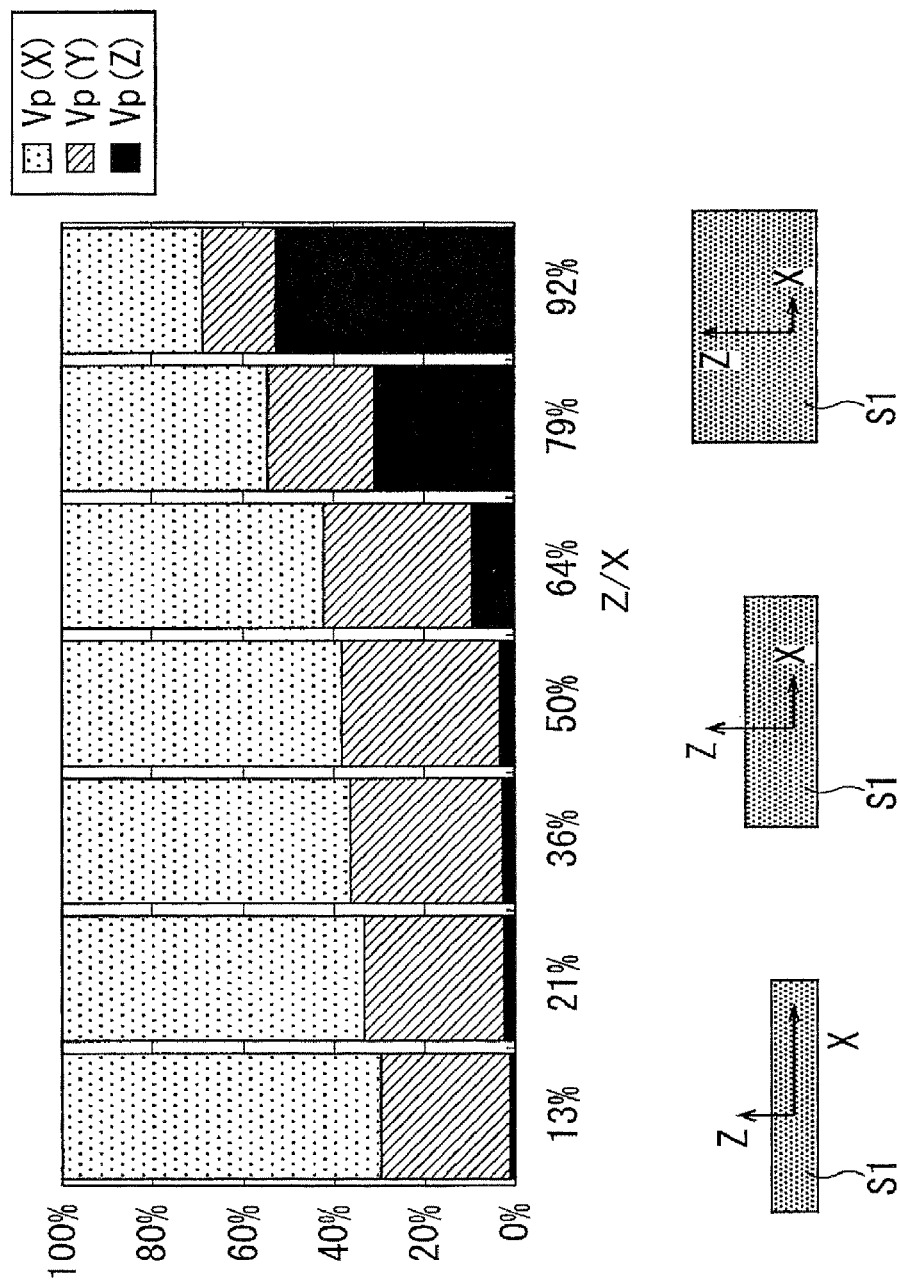
FIG. 21 is a graph showing a relationship between a flatness rate of a sound-absorbing space, and a ratio between respective velocity components of a particle velocity.

With a view to increasing a rate of the horizontal velocity component of the particle velocity, the sound-absorbing space S1 is designed in consideration of a flatness rate. In FIG. 21, the flatness rate was defined as follows in order to clarify an influence of the flatness rate of the sound-absorbing space S1 on a direction of the velocity components of the particle velocity. Given that a rightward-leftward direction on the drawing sheet, a direction orthogonal to the drawing sheet, and an upward-downward direction on the drawing sheet, are an X direction, a Y direction, and a Z direction, respectively, a ratio (Z/X) of a length in the Z direction to a length in the X direction was defined as the flatness rate of the sound-absorbing space S1. Then, an experimental test was carried out to clarify a ratio of X-directional, Y-directional and Z-directional velocity components Vp (X), Vp (Y), Vp (Z) of the particle velocity generated by the micro-vibration of the roof trim, under a condition that the flatness rate (Z/X) is variously changed. FIG. 21 shows a result of the test. The result illustrated in FIG. 21 showed that almost no Z-directional velocity component Vp (Z) is generated when the flatness rate (Z/X) is set at 50% or less, and most of the velocity components are occupied by the X-directional and Y-directional velocity components Vp (X), Vp (Y). Thus, it was proven that it is desirable to set the flatness rate of the sound-absorbing space S1 at 50% or less. In the sound-absorbing structure according the second embodiment, the flatness rate of the sound-absorbing space S1 is set in this manner.

Figure 22:
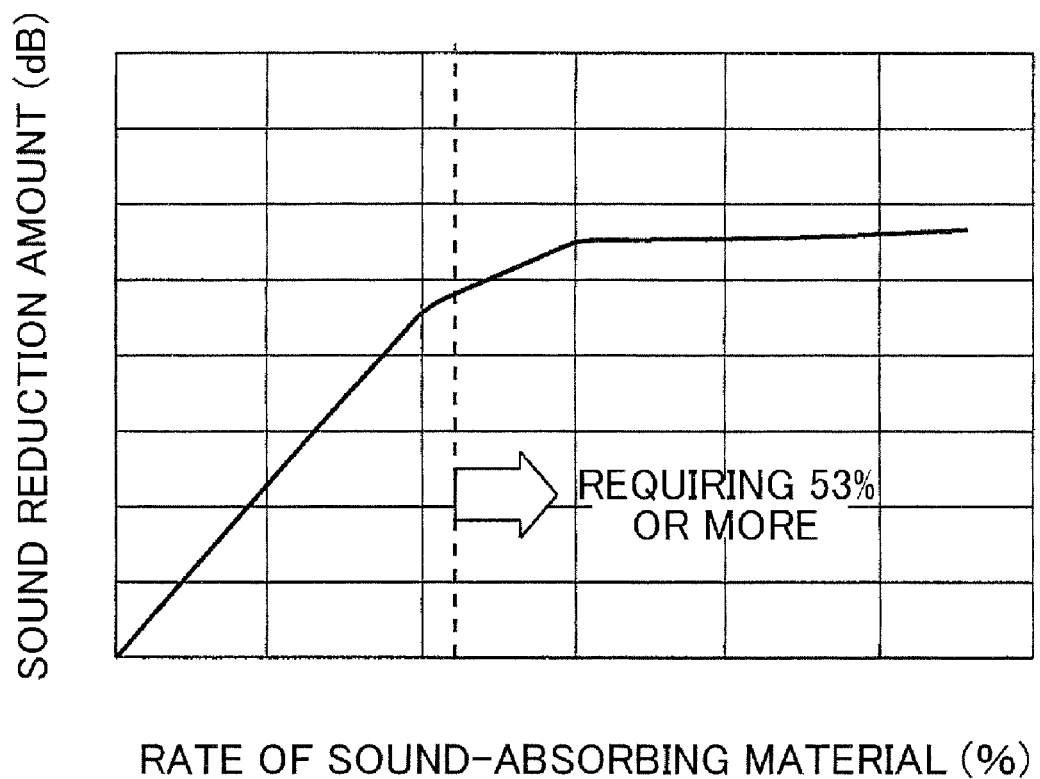
FIG. 22 is a graph showing a relationship between a sound absorption effect and a filling rate of a sound-absorbing material relative to the sound-absorbing space.

The sound-absorbing structure according the second embodiment is also designed in consideration of a filling rate of the desired sound-absorbing material 50 relative to the sound-absorbing space S1. Specifically, an experimental test was carried out to clarify a relationship between a low/intermediate-frequency sound reduction amount, and the filling rate of the desired sound-absorbing material 50 (i.e., a volume of the desired sound-absorbing material 50/a volume of the sound-absorbing space S1). FIG. 22 shows a result of the test. This result was obtained by measuring the sound reduction amount under a condition that the desired sound-absorbing material 50 is disposed to extend over the entire inner surface of the sound-absorbing space S1 at an approximately even thickness. The result illustrated in FIG. 22 showed that the sound reduction amount is saturated when the filling rate is increased up to 53%, and maintained at an approximately constant value when the filling rate is 75% or more. Thus, it was proven that it is desirable to set the filling rate of the desired sound-absorbing material 50 relative to the sound-absorbing space S1 at 53% or more. In the sound-absorbing structure according the second embodiment, the filling rate of the desired sound-absorbing material 50 is set in this manner. That is, the desired sound-absorbing material 50 is preferably disposed within the sound-absorbing space S1 in such a manner as to approximately fill up the sound-absorbing space S1 in a thicknesswise direction of the sound-absorbing space S1.

A state when the filling rate is 100% means that the sound-absorbing space S1 is filled with the desired sound-absorbing material 50 in the thicknesswise direction of the sound-absorbing space S1, without compressing the desired sound-absorbing material 50. The sound reduction amount means an amount of reduced sound level (dB) when a sound-absorbing material is installed as compared when a sound-absorbing material is not installed.

As shown in FIG. 13, in the vehicle 1, the sound-absorbing structure is installed in various positions in addition to the roof portion. For example, as is well known, in a side door, a door module (not shown) is attached to a door inner panel. Further, a door trim 20 is provided as an interior trim for covering a surface of the inner surface on the side of the passenger compartment 3 while covering the door module. A space between the door trim 20 and the door module is used as a sound-absorbing space, and the desired sound-absorbing material is installed in the sound-absorbing space. In this case, the door trim 20 is used as the vibrating plate member, wherein an attaching portion 21 as an outer peripheral region of the door trim 20 serves as the anchor portion 11, and the remaining portion (indicated by the broken line) surrounded by the attaching portion 21 serves as the vibratable portion 22. Further, in the second embodiment, a floor under cover 30 disposed below the passenger compartment 3, and an engine under cover 40, are fixed to an under body (sub-frame) 7 provided in a lower portion of the vehicle body 2, as shown in FIG. 13. Each of the floor under cover 30 and engine under cover 40 corresponds to the aforementioned second plate member. Each of the floor under cover 30 and engine under cover 40 defines a sound-absorbing space (S3, S4) in cooperation with the under body 7 which is an exterior member fixed to a body shell of the vehicle body 2, and the desired sound-absorbing material 50 is disposed in each of the sound-absorbing spaces S3, S4. Additionally, the sound-absorbing structure may be formed, for example, in a sidewall of a trunk compartment or a trunk floor. Further, the sound-absorbing structure may be applied to any suitable structure other than the vehicle, such as a wall structure of a building and a sidewall structure of an expressway. In this case, a member serving as a vibrating plate member (first plate member) is disposed on an inward side relative to a second plate member defining a sound-absorbing space therebetween.

As mentioned above in detail, according to a first aspect of the present invention, there is provided a sound-absorbing material which has a flow resistivity R of $3.3 \times 10^4$ N·s/m$^4$ or more, a Young's modulus E of $1.2 \times 10^3$ to $2.0 \times 10^4$ N/m$^2$, and a loss factor δ of 0.12 or less.

In the sound-absorbing material of the present invention, each of the flow resistivity R, the Young's modulus E and the loss factor δ which mostly determine a sound-absorbing capability in the range of a low/intermediate-frequency region to a high-frequency region is set to fall within the above desired range determined in view of enhancing the sound-absorbing capability in both the low/intermediate-frequency region and the high-frequency region. Thus, the sound-absorbing capability can be reliably enhanced in a wide range of the low/intermediate-frequency region to the high-frequency region at a higher level as compared with conventional sound-absorbing materials.

Preferably, the sound-absorbing material of the present invention has a sound absorption characteristic of absorbing sound in the range of 100 Hz to 10 kHz. According to this feature, the sound-absorbing material is set to absorb sound in the range of 100 Hz to 10 kHz. Thus, the sound-absorbing capability can be reliably enhanced in the specific frequency region at a higher level as compared with conventional sound-absorbing materials.

Preferably, the sound-absorbing material of the present invention is adapted to be used in a sound-absorbing structure comprising a pair of plate members disposed in opposed relation to each other to define a flat sound-absorbing space therebetween, wherein one of the pair of plate members is a vibrating plate member having a vibratable portion adapted to be brought into micro-vibration by a wave motion in a low/intermediate-frequency region, wherein the sound-absorbing material is disposed within the sound-absorbing space at a position facing the vibratable portion. According to this feature, a low/intermediate-frequency sound on an outside of the sound-absorbing space can be propagated into the sound-absorbing space by the micro-vibration of the vibrating plate member (the vibratable portion of the vibrating plate member) of the sound-absorbing structure to allow an air particle velocity to increased while being distributed along the vibrating plate member within the sound-absorbing space. This makes it possible to allow the sound-absorbing material to effectively play a roll in primarily absorbing the low/intermediate-frequency sound.

Preferably, the sound-absorbing material of the present invention is adapted to be used in a sound-absorbing structure comprising a plate member disposed in opposed relation to at least a part of a vehicle body of a vehicle to define therebetween a sound-absorbing space located outside a passenger compartment of the vehicle, wherein the plate member is a vibrating plate member having a vibratable portion adapted to be brought into micro-vibration by a wave motion in a low/intermediate-frequency region, wherein the vibrating plate member is located to face the passenger compartment, and the sound-absorbing material is disposed within the sound-absorbing space at a position facing the vibratable portion. According to this feature, the vibrating plate member of the sound-absorbing structure is located to face the passenger compartment. This makes it possible to allow the sound-absorbing material disposed in the sound-absorbing space to absorb not only a high-frequency sound but also the low/intermediate-frequency sound in the passenger compartment through means of the micro-vibration of the vibrating plate member (the vibratable portion of the vibrating plate member).

Preferably, the sound-absorbing material of the present invention includes matrix fibers thermally bonded together by binder fibers. Preferably, in the sound-absorbing material including matrix fibers thermally bonded together by binder fibers, the matrix fibers are crimped fibers, because it is more effective in increasing the flow resistivity R. Preferably, the matrix fibers preferably comprise polyethylene terephthalate fibers and acrylic fibers which are mixed together while adjusting a mixing ratio therebetween. The mixing ratio of the polyethylene terephthalate fibers can be increased to increase the Young's modulus E and reduce loss factor $\delta$, and the mixing ratio of the acrylic fibers can be increased to reduce the Young's modulus E and increase loss factor $\delta$. Thus, the Young's modulus E and reduce loss factor $\delta$ can be effectively adjusted by forming the matrix fibers while adjusting the mixing ratio between the polyethylene terephthalate fibers and the acrylic fibers. Preferably, the matrix fibers comprise Solid fibers and Hollow fibers which are mixed together while adjusting a mixing ratio therebetween. The mixing ratio of the solid fibers can be increased to increase the Young's modulus E and reduce loss factor $\delta$, and the mixing ratio of the hollow fibers can be increased to reduce the Young's modulus E and increase loss factor $\delta$. Thus, the Young's modulus E and reduce loss factor $\delta$ can be effectively adjusted by forming the matrix fibers while adjusting the mixing ratio between the solid fibers and the hollow fibers.

According to another aspect of the present invention, there is provided a method of producing a sound-absorbing material, which comprises the step of pressing a fiber mixture including matrix fibers and binder fibers, under heating, to form the fiber mixture into a given shape, wherein a type of the matrix fibers, a percentage of hollowness of the matrix fibers, a crimping rate of the matrix fibers, a forming temperature, a forming cycle time, and a ratio of the binder fibers to the entire fiber mixture, are adjusted to allow the sound-absorbing material to have a flow resistivity R of $3.3 \times 10^4$ N·s/m$^4$ or more, a Young's modulus E of $1.2 \times 10^3$ to $\mathbf{2.0 \times 10^4}$ N/m$^2$, and a loss factor $\delta$ of 0.12 or less.

In the sound-absorbing material production method of the present invention, each of the flow resistivity R, the Young's modulus E and the loss factor $\delta$ which are factors mostly determining the sound-absorbing capability in the range of the low/intermediate-frequency region to the high-frequency region is set to fall within the above desired range determined in view of enhancing the sound-absorbing capability in both the low/intermediate-frequency region and the high-frequency region. This makes it possible to produce a sound-absorbing material having an enhanced sound-absorbing capability in a wide range of the low/intermediate-frequency region to the high-frequency region at a higher level as compared with conventional sound-absorbing materials.

According to yet another aspect of the present invention, there is provided a sound-absorbing structure comprising a pair of plate members disposed in opposed relation to each other to define a sound-absorbing space therebetween, and a sound-absorbing material disposed within the sound-absorbing space, wherein one of the pair of plate members is a vibrating plate member having a vibratable portion adapted to be brought into micro-vibration by a wave motion in a low/intermediate-frequency region, and the sound-absorbing material is disposed at a position facing the vibratable portion, wherein the sound-absorbing material having a flow resistivity R of $3.3 \times 10^4$ N·s/m$^4$ or more, a Young's modulus E of $1.2 \times 10^3$ to $2.0 \times 10^4$ N/m$^2$, and a loss factor $\delta$ of 0.12 or less.

In the sound-absorbing structure of the present invention, an air particle velocity in not only the high-frequency sound entering into the sound-absorption space but also the low/intermediate-frequency sound can be increased while being distributed along the vibrating plate member, by the micro-vibration of the vibrating plate member (the vibratable portion of the vibrating plate member). This makes it possible to allow the sound-absorbing material disposed in the sound-absorbing space to absorb sound adequately and effectively in a wide range of the low/intermediate-frequency region to the high-frequency region.

Preferably, in the sound-absorbing structure of the present invention, the sound-absorbing material is disposed within the sound-absorbing space in such a manner as to approximately fill up the sound-absorbing space in a thicknesswise direction of the sound-absorbing space. According to this feature, the sound absorption capability can be maximally brought out by means of a level of filling of the sound-absorbing space with the sound-absorbing material based on inventers knowledge.

Preferably, in the sound-absorbing structure of the present invention, the vibratable portion of the vibrating plate member has a stiffness less than that of the remaining portion of the vibrating plate member other than the vibratable portion. According to this feature, the stiffness of the vibratable portion of the vibrating plate member is set to be less than that of the remaining portion of the vibrating plate member other than the vibratable portion. This makes it possible to promote the micro-vibration of the vibratable portion so as to increase a particle velocity in the low/intermediate-frequency sound within the sound-absorbing space. Thus, the low/intermediate-frequency sound absorption capability of the sound-absorbing material can be more enhanced. Further, according to inventers' knowledge, the stiffness of the one of the pair of plate members (i.e., the vibrating plate member) has almost no influence on absorption of the high-frequency sound. Thus, even if the stiffness of the vibratable portion is lowered to enhance the low/intermediate-frequency sound absorption effect, a deterioration in the high-frequency sound absorption effect can be suppressed at a significantly low level.

Preferably, in the sound-absorbing structure of the present invention, the vibrating plate member is formed using an inner member which is a component of an existing structural assembly. This feature makes it possible to eliminate a need for preparing the vibrating plate member as a separate component when the sound-absorbing structure is formed in an existing structural assembly. Thus, the number of components to be newly employed can be cut down.

Preferably, in the sound-absorbing structure of the present invention, the vibrating plate member is a trim member of a vehicle. According to this feature, when the sound-absorbing structure is formed in a vehicle as an existing structural assembly, the trim member of the vehicle can be effectively utilized to cut down the number of components to be newly employed.

Preferably, in the above sound-absorbing structure, the trim member is a roof trim. According to this feature, the roof trim can be effectively utilized to cut down the number of components to be newly employed. In addition, a relatively wide area of the roof trim can be utilized to provide enhanced flexibility of installation of the sound-absorbing material while allowing the sound-absorbing material to be arranged in a wider range so as to more effectively enhance the sound absorption capability.

This application is based on Japanese Patent Application Serial No. 2007-203931 filed in Japan Patent Office on Aug. 6, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of producing a sound-absorbing material, comprising the step of pressing a fiber mixture including matrix fibers and binder fibers, under heating, to form said fiber mixture into a given shape, wherein a type of said matrix fibers, a percentage of hollowness of said matrix fibers, a crimping rate of said matrix fibers, a forming temperature, a forming cycle time, and a ratio of said binder fibers to said entire fiber mixture, are adjusted to allow said sound-absorbing material to have a flow resistivity R of $3.3 \times 10^4$ N·s/m$^4$ or more, a Young's modulus E of $1.2 \times 10^3$ to $2.0 \times 10^4$ N/m$^2$, and a loss factor $\delta$ of 0.12 or less 2. The method of producing a sound-absorbing material as defined in claim 1, wherein the sound-absorbing material has a sound absorption characteristic of absorbing sound in the range of 100 Hz to 10 kHz.

3. The method of producing a sound-absorbing material as defined in claim 1, wherein the matrix fibers are thermally bonded together by binder fibers.

4. The method of producing a sound-absorbing material as defined in claim 3, wherein said matrix fibers are crimped fibers.

5. The method of producing a sound-absorbing material as defined in claim 3, wherein said matrix fibers comprise polyethylene terephthalate fibers and acrylic fibers which are mixed together while adjusting a mixing ratio therebetween.

6. The method of producing a sound-absorbing material as defined in claim 3, wherein said matrix fibers comprise solid fibers and hollow fibers which are mixed together while adjusting a mixing ratio therebetween.

* * * * *